(12) United States Patent
Tanaka et al.

(10) Patent No.: US 7,618,685 B2
(45) Date of Patent: Nov. 17, 2009

(54) RELEASE-TREATED SUBSTRATE AND METHOD OF PRODUCING THE SAME

(75) Inventors: Kazumasa Tanaka, Osaka (JP); Masatomi Harada, Osaka (JP)

(73) Assignee: Nitto Denko Corporation, Osaka (JP)

( * ) Notice: Subject to any disclaimer, the term of this patent is extended or adjusted under 35 U.S.C. 154(b) by 334 days.

(21) Appl. No.: 11/498,099

(22) Filed: Aug. 3, 2006

(65) Prior Publication Data

US 2007/0036992 A1 Feb. 15, 2007

(30) Foreign Application Priority Data

Aug. 3, 2005 (JP) .......................... P.2005-225273

(51) Int. Cl.
*B05D 3/02* (2006.01)
*B05D 3/06* (2006.01)

(52) U.S. Cl. ........................ 427/515; 427/387; 427/553

(58) Field of Classification Search ........................ None
See application file for complete search history.

(56) References Cited

U.S. PATENT DOCUMENTS

| 4,603,168 A * | 7/1986 | Sasaki et al. .................... 522/18 |
| 5,409,773 A * | 4/1995 | Kessel et al. ................. 428/352 |
| 5,753,346 A * | 5/1998 | Leir et al. .................... 428/145 |
| 6,333,117 B1 * | 12/2001 | Sumi et al. .................... 428/451 |
| 6,797,333 B2 * | 9/2004 | Haase et al. ................. 427/515 |
| 7,285,579 B2 * | 10/2007 | Ghoshal ....................... 522/31 |
| 2003/0008081 A1 | 1/2003 | Haase et al. |
| 2003/0027003 A1 * | 2/2003 | Nakamura et al. .......... 428/447 |

FOREIGN PATENT DOCUMENTS

| JP | 2001-226592 A | 8/2001 |
| WO | 00/44844 | 8/2000 |

OTHER PUBLICATIONS

European Search Report dated Jun. 18, 2007.

* cited by examiner

*Primary Examiner*—Marc S Zimmer
(74) *Attorney, Agent, or Firm*—Sughrue Mion, PLLC

(57) ABSTRACT

A release-treated substrate is a release-treated substrate having a release treating agent layer by a cationically polymerizable ultraviolet curing silicone treating agent at least partially on at least one side of the substrate, and is characterized in that the cationically polymerizable ultraviolet curing silicone treating agent is at least partially applied to at least one side of the substrate, and heat treatment is then conducted before conducting ultraviolet irradiation treatment. As the cationically polymerizable ultraviolet curing silicone treating agent, a cationically polymerizable ultraviolet curing silicone treating agent in which a modified silicone polymer component having at least two epoxy groups in the molecule is an effective component is suitable. It is preferable that temperature in the heat treatment is from 35 to 120° C.

6 Claims, 1 Drawing Sheet

RELEASE-TREATED SUBSTRATE AND METHOD OF PRODUCING THE SAME

FIELD OF THE INVENTION

The present invention relates to a release-treated substrate such as a release liner used in a pressure-sensitive adhesive tape or a sheet, or a substrate for a pressure-sensitive adhesive tape or sheet having a release-treated back surface, and a method of producing the same. More particularly, it relates to a release-treated substrate having excellent adhesion between a release treating agent layer by a cationically polymerizable ultraviolet curing silicone release treating agent, and a substrate, and capable of suppressing or preventing dropout of a silicone component in the release treating agent layer from the substrate even in the case of exposing under excessive heating and humidifying conditions, or in the case of storing over a long period of time, and a method of producing the same.

BACKGROUND OF THE INVENTION

As ultraviolet curing silicone release treating agents, a cationically polymerizable ultraviolet curing silicone release treating agent that cures by cationic polymerization (cationic polymerization type ultraviolet curing silicone release treating agent), a radically polymerizable ultraviolet curing silicone release treating agent that cures by radical polymerization, a radically addition-polymerizable ultraviolet curing silicone release treating agent that cures by radical addition polymerization, a hydrosilylation reactive ultraviolet curing silicone release treating agent that cures by hydrosilylation reaction, and the like are utilized. In such ultraviolet curing silicone release treating agents, the cationically polymerizable ultraviolet curing silicone release treating agent exhibits small volume shrinkage after curing as compared with the radically polymerizable ultraviolet curing silicone release treating agent, the radically addition-polymerizable ultraviolet curing silicone release treating agent and the hydrosilylation reactive ultraviolet curing silicone release treating agent. It is therefore said that a release treating agent layer by the cationically polymerizable ultraviolet curing silicone release treating agent has good adhesion to a substrate (see JP-A-2001-226592 (the term "JP-A" as used herein means an "unexamined published Japanese patent application")). However, there was the case that the release treating agent layer by the cationically polymerizable ultraviolet curing silicone release treating agent may not have sufficient adhesion to a substrate, depending on a material or structure of the substrate in the release-treated substrate, a coating thickness of the cationically polymerizable ultraviolet curing silicone release treating agent, and the like.

Further, even though there is no problem in the use under general mild environments, in the case that a release-treated substrate alone or a release-treated substrate having a pressure-sensitive adhesive layer adhered thereto is exposed under excessive heating or humidifying conditions, or is stored over a long period of time, a silicone component in the release treating agent layer drops out of the substrate. For example, in the case that the release-treated substrate is adhered to a pressure-sensitive adhesive layer, there was the case of remaining on a surface of the pressure-sensitive adhesive layer, thereby greatly hindering pressure-sensitive adhesive properties. For this reason, it is desired that the release treating agent layer by the cationically polymerizable ultraviolet curing silicone release treating agent is sufficiently adhered to a substrate of the release-treated substrate in order to maintain release properties of the release-treated substrate and pressure-sensitive adhesive properties of a pressure-sensitive adhesive tape or sheet in a stable state.

SUMMARY OF THE INVENTION

Accordingly, one object of the present invention is to provide a release-treated substrate having excellent adhesion between a release treating agent layer by a cationically polymerizable ultraviolet curing silicone release treating agent, and a substrate, and a method of producing the same.

Another object of the present invention is to provide a release-treated substrate capable of suppressing or preventing dropout of a silicone component in the release treating agent layer from the substrate even in the case of exposing under excessive heating or humidifying conditions, or storing over a long period of time, and a method of producing the same.

As a result of keen investigations to achieve the above objects, the present inventors have found that when a cationically polymerizable ultraviolet curing silicone release treating agent is used as a release treating agent, and a release treating agent layer by a cationically polymerizable ultraviolet curing silicone release treating agent is formed through heat treatment, adhesion of the release treating agent layer by the cationically polymerizable ultraviolet curing silicone release treating agent to the substrate can remarkably be improved. The present invention has been completed based on those findings.

That is, the present invention is a release-treated substrate having a release treating agent layer by a cationically polymerizable ultraviolet curing silicone release treating agent at least partially on at least one side of a substrate, characterized in that after at least partially applying the cationically polymerizable ultraviolet curing silicone release treating agent to at least one side of the substrate, and before conducting ultraviolet irradiation treatment, heat treatment is conducted.

As the cationically polymerizable ultraviolet curing silicone release treating agent, a cationically polymerizable ultraviolet curing silicone release treating agent wherein a modified silicone polymer component having at least two epoxy groups in the molecule is an effective component can suitably be used.

In the present invention, as the temperature in the heat treatment, it is preferable to be from 35 to 120° C.

Further, as the release-treated substrate, it is suitable that when placing on a glass plate such that a surface of the side on which a coating by the cationically polymerizable ultraviolet curing silicone release treating agent layer is formed faces upward, placing a silicone rubber having a contact area of 10 mm×10 mm and Shore A hardness (JIS K6301, spring type A model) of 70 on the coating, and conducting an operation of reciprocating 10 cm under a pressure abrasion of 0.5 MPa at a speed of 1 m/min five times, the coating does not drop out of the substrate.

As the release-treated substrate of the present invention, it is preferable to be a release liner having the release treating agent layer by the cationically polymerizable ultraviolet curing silicone release treating agent on one side or both sides of the substrate, or a substrate for a pressure-sensitive adhesive tape or sheet, having the release treating agent layer by the cationically polymerizable ultraviolet curing silicone release treating agent on one side of the substrate, other side being a face for forming a pressure-sensitive adhesive layer and having been subjected to back treatment.

The present invention further provides a method of producing the release-treated substrate, characterized by having a step of conducting heat treatment to a coating layer of the cationically polymerizable ultraviolet curing silicone release treating agent, which is formed by applying the cationically polymerizable ultraviolet curing silicone release treating agent at least partially to at least one side of a substrate, and which is not subjected to ultraviolet irradiation treatment.

Figure 1A:
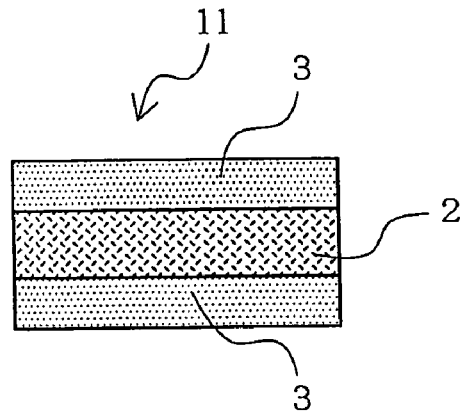
FIGS. 1A, 1B and 1C each is a schematic cross-sectional view showing an example of the release-treated substrate of the present invention.

DESCRIPTION OF REFERENCE NUMERALS AND SIGNS 11 to 13 Release-treated substrate, respectively
2 Substrate
3 Heat-treated UV cationic silicone release treating agent layer
4 Pressure-sensitive adhesive layer
5 Pressure-sensitive adhesive tape or sheet

DETAILED DESCRIPTION OF THE INVENTION

The embodiment of the present invention is described in detail below by referring to the accompanying drawings, if necessary. The same members or parts may have the same reference numerals and signs.

[Release-Treated Substrate]

Figure 1B:
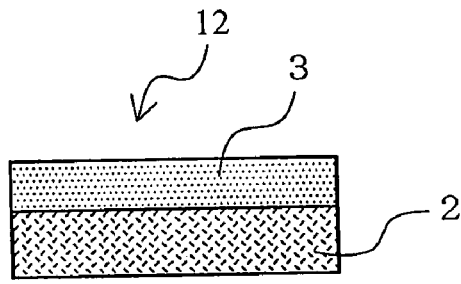
Figure 1C:
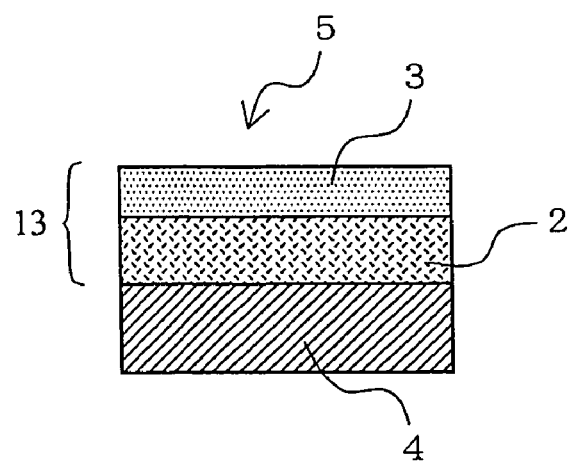

The release-treated substrate of the present invention has a release treating agent layer (hereinafter sometimes referred to as "UV cationic silicone release treating agent layer") by a cationically polymerizable ultraviolet curing silicone release treating agent (hereinafter sometimes referred to as "UV cationic silicone release treating agent") at least partially on at least one side of the substrate, as shown in FIG. 1A, 1B or 1C. The UV cationic silicone release treating agent layer is formed by at least partially applying the UV cationic silicone release treating agent to at least one side of the substrate, and conducting heat treatment before conducting ultraviolet irradiation treatment. As a result, the UV cationic silicone release treating agent layer (hereinafter sometimes referred to as "heat-treated UV cationic silicone release treating agent layer") formed by applying the UV cationic silicone release treating agent, and conducting heat treatment before conducting ultraviolet irradiation treatment is formed on the substrate with excellent adhesion, regardless of a material or structure of the substrate, a kind of the UV cationic silicone release treating agent, a thickness of the heat-treated UV cationic silicone release treating agent layer, and the like, and even in the case of exposing under excessive heating or humidifying conditions, or storing over a long period of time, dropout of a silicone component in the heat-treated UV cationic release treating agent layer from the substrate is suppressed or prevented. Therefore, when the release-treated substrate of the present invention is used, release properties as a release liner or pressure-sensitive adhesive properties of a pressure-sensitive adhesive tape or sheet can be held or maintained in a stable state.

FIGS. 1A, 1B and 1C each is a schematic sectional view showing the example of the release-treated substrate of the present invention. In FIG. 1A, 1B or 1C, 11 to 13 are a release-treated substrate, respectively, 2 is a substrate, 3 is a heat-treated UV cationic silicone release treating agent layer, 4 is a pressure-sensitive adhesive layer, and 5 is a pressure-sensitive adhesive tape or sheet. The release-treated substrate 11 shown in FIG. 1A is a release liner having a constitution that the heat-treated UV cationic silicone release treating agent layer 3 is formed on both sides of the substrate 2. Further, the release-treated substrate 12 shown in FIG. 1B is a release liner having a constitution that the heat-treated UV cationic silicone release treating agent layer 3 is formed on one side of the substrate 2. Moreover, release-treated substrate 13 shown in FIG. 1C is a substrate for a pressure-sensitive adhesive tape or sheet, having the heat-treated UV cationic silicone release treating agent layer 3 formed on one side of the substrate 2, other side being a face for forming a pressure-sensitive adhesive layer and having been subjected to back treatment, wherein the pressure-sensitive adhesive layer 4 is formed on the side for forming the pressure-sensitive adhesive layer in the release-treated substrate 13 (that is, the side on which the heat-treated UV cationic silicone release treating agent layer 3 is not formed), and the whole of the release-treated substrate 13 and the pressure-sensitive adhesive layer 4 constitutes the pressure-sensitive adhesive tape or sheet 5.

However, the heat-treated UV cationic silicone release treating agent layer 3 is formed by at least partially applying the UV cationic silicone release treating agent to at least side of the substrate, conducting heat treatment, and then conducting ultraviolet irradiation treatment. That is, the heat treatment is conducted between after applying the UV cationic silicone release treating agent and before conducting the ultraviolet irradiation treatment. Because this heat treatment is conducted before curing with the ultraviolet irradiation treatment, when the heat treatment is conducted, an uncured UV cationic silicone release treating agent can spread into details on the substrate surface, and further, an interfacial compatibilization effect is exhibited. Consequently, when ultraviolet irradiation treatment is conducted to cure after the heat treatment, the heat-treated UV cationic silicone release treating agent layer can be formed on the substrate with good adhesion.

(Heat-Treated UV Cationic Silicone Release Treating Agent Layer)

The heat-treated UV cationic silicone release treating agent layer is at least partially formed on one side or both sides of the substrate by conducting heat treatment after applying the UV cationic silicone release treating agent and before conducting the ultraviolet irradiation treatment. The UV cationic silicone release treating agent can form a releasable coating by curing (crosslinking) with ultraviolet irradiation, thereby forming a UV cationic silicone release treating agent layer exhibiting release properties excellent in heat stability. Such a UV cationic silicone release treating agent is not particularly limited so long as it is a cationic polymerization type silicone release treating agent capable of curing (crosslinking) with ultraviolet irradiation. The UV cationic silicone release treating agent can be used alone or by combining two or more thereof.

In the UV cationic silicone release treating agent, a modified silicone polymer component (modified polysiloxane component) having one or more cationic polymerization reactive functional group (or cationic polymerization reactive site) introduced into a polysiloxane component of a main chain is used in one kind or by combining two kinds or more. In such a modified silicone polymer component, as the cationic polymerization reactive functional group, for example, an epoxy group (particularly, an alicyclic epoxy resin or the like) can suitably be used. Further, it is preferable that at least two cationic polymerization reactive functional groups are introduced into one molecule of the modified silicone polymer component. The cationic polymerization reactive functional group may directly be bonded to a silicon atom of the main chain or side chain in the modified silicone polymer component, or may be bonded through a divalent group (for example, a divalent organic group such as an alkylene group or an alkyleneoxy group).

Therefore, as the modified silicone polymer component having introduced therein the cationic polymerization reactive functional group, a modified silicone polymer component having at least two epoxy groups in the molecule can suitably be used. The modified silicone polymer component having at least two epoxy groups in the molecule is not particularly limited, but, for example, a modified silicone polymer component in which at least two epoxy group-containing groups such as γ-glycidyloxypropyl group, β(3,4-epoxycyclohexyl)ethyl group and β(4-methyl-3,4-epoxycyclohexyl)propyl group are introduced into the polysiloxane component of the main chain is exemplified. The epoxy group-containing group can be introduced into the molecule by using, for example, "HOSi($R^1$)($R^2$)OH)" ($R^1$ is an epoxy group-containing group, and $R^2$ is a hydrogen atom or a hydrocarbon group) as a monomer component.

The modified silicone polymer component may have a chain form of either of a linear form and a branched form, and also may be a mixture of those.

In the UV cationic silicone release treating agent, various ultraviolet cleaving initiators (photopolymerization initiators) are used in one kind or by combining two kinds or more. As such an ultraviolet cleaving initiator, an onium salt ultraviolet cleaving initiator (onium salt photopolymerization initiator) can suitably be used. The ultraviolet cleaving initiator can be used in one kind or by combining two kinds or more.

As the onium salt ultraviolet cleaving initiator used as the ultraviolet cleaving initiator, for example, an onium salt photoinitiator described in JP-A-6-32873, an onium salt photoinitiator described in JP-A-2000-281965, an onium salt photoinitiator described in JP-A-11-228702 and an onium salt photoinitiator described in JP-B-8-26120 (the term "JP-B" as used herein means an "examined Japanese patent publication") are exemplified. As such an onium salt ultraviolet cleaving initiator, a diaryliodonium salt, a triarylsulfonium salt, a triarylselenonium salt, a tetraarylphosphonium salt, an aryldiazonium salt and the like are exemplified. As the onium salt ultraviolet cleaving initiator, a diaryliodonium salt is suitable.

More specifically, for example, as the diaryliodonium salt, a compound represented by $Y_2I^+X^-$ (Y represents an aryl group which may have a substituent. $X^-$ represents a non-nucleophilic and non-basic anion.) is exemplified. As the non-nucleophilic and non-basic anion of $X^-$, for example, $SbF_6^-$, $SbCl_6^-$, $BF_4^-$, $[B(C_6H_5)_4]^-$, $[B(C_6F_5)_4]^-$, $[B(C_6H_4CF_3)_4]^-$, $[(C_6F_5)_2BF_2]^-$, $[C_6F_5BF_3]^-$, $[B(C_6H_3F_2)_4]^-$, $AsF_6^-$, $PF_6^-$, $HSO_4^-$ and $ClO_4^-$ are exemplified.

As the triarylsulfonium salt, triarylselenonium salt, tetraarylphosphonium salt and aryldiazonium salt, compounds corresponding to the diaryliodonium salt are exemplified. Specifically, as the triarylsulfonium salt, triarylselenonium salt, tetraarylphosphonium salt and aryldiazonium salt, compounds represented by $Y_3S^+X^-$, $Y_3Se^+X^-$, $Y_4P^+X^-$ and $YN_2X^-$ (Y and $X^-$ are the same as described above) can be used, respectively.

As the onium salt ultraviolet cleaving initiator, an ultraviolet cleaving initiator containing an antimony atom (antimony ultraviolet cleaving initiator), and an ultraviolet cleaving initiator containing a boron atom (boron ultraviolet cleaving initiator) can suitably be used. In particular, a diaryliodonium salt ultraviolet cleaving initiator containing an antimony atom, and a diaryliodonium salt ultraviolet cleaving initiator containing a boron atom are suitable.

Therefore, as the UV cationic silicone release treating agent, for example, one containing at least a modified silicone polymer component having at least two epoxy groups in the molecule (epoxy group-containing polysiloxane component) and an ultraviolet cleaving initiator is exemplified. In the UV cationic silicone release treating agent, the proportion of the ultraviolet cleaving initiator is not particularly limited so long as it is a catalytic amount, but, for example, can be selected from a range of from 0.1 to 8 parts by weight (preferably from 0.3 to 5 parts by weight, and more preferably from 0.5 to 3 parts by weight) per 100 parts by weight of the epoxy group-containing polysiloxane component.

The heat-treated UV cationic silicone release treating agent layer can be formed by applying the UV cationic silicone release treating agent on at least one side of the substrate in at least partially (entirely or partially) predetermined site, conducting the heat treatment at a predetermined temperature, and then conducting the ultraviolet irradiation treatment. In applying the UV cationic silicone release treating agent, it is important to apply with an appropriate application amount. Where the application amount of the UV cationic silicone release treating agent is too small, peel strength (force required for peeling) increases, resulting in causing practical problem. On the other hand, where it is too large, cost increases, which is economically disadvantageous. The appropriate amount (solid content) of the UV cationic silicone release treating agent can appropriately be selected depending on the kind of the UV cationic silicone release treating agent, the kind of the substrate to which the UV cationic silicone release treating agent is applied, the kind of a pressure-sensitive adhesive for forming a pressure-sensitive adhesive layer laminated on the heat-treated UV cationic silicone release treating agent layer, and the like, but is, for example, from about 0.01 to 10 $g/m^2$, and preferably from 0.05 to 5 $g/m^2$.

Further, in conducting the heat treatment to the coating layer of the UV cationic silicone release treating agent (uncured UV cationic silicone release treating agent layer), the conventional heating apparatuses can be used. For example, a method of placing in a heating oven set to a predetermined temperature for a predetermined time to conduct heat treatment is exemplified. The heat treatment temperature can be selected from, for example, a range of from 35 to 120° C., depending on the kind of the UV cationic silicone release treating agent, the kind of the substrate and the like, and is preferably from 40 to 110° C. (more preferably from 50 to 100° C.). Further, the heating time can be selected from, for example, a range of from 3 seconds to 2 minutes (preferably from 5 seconds to 1 minute). Where the heat treatment temperature is lower than 35° C., an adhesion improvement effect between the heat-treated UV cationic silicone release treating agent layer and the substrate deteriorates, and on the other hand, where exceeding 120° C., there is the possibility that the modified silicone polymer component contained as the effective component in the UV cationic silicone release treating agent (for example, the modified silicone polymer component in which the cationic polymerization reactive functional group is introduced into a polysiloxane component of a main chain) evaporates, which is not preferable.

Further, in conducting the ultraviolet irradiation treatment to the heat-treated uncured UV cationic silicone release treating agent layer, the conventional ultraviolet irradiation treatment methods can appropriately be utilized. Ultraviolet irradiation energy, irradiation time and the like are not particularly limited, and it is sufficient so long as the uncured UV cationic silicone release treating agent layer can be cured by activating the ultraviolet cleaving initiator (photopolymerization initiator).

The thickness of the heat-treated uncured UV cationic silicone release treating agent layer is not particularly limited, but can be selected form, for example, a range of from 0.01 to 5 μm (preferably from 0.05 to 4 μm, and more preferably from 0.1 to 3 μm).

(Substrate)

The release-treated substrate of the present invention has the heat-treated uncured UV cationic silicone release treating agent layer at least partially on one side or both sides of the substrate. Specifically, the release-treated substrate can be utilized as a release liner having the heat-treated UV cationic silicone release treating agent layer on one side or both sides of the substrate (substrate for a release liner), or a substrate for a pressure-sensitive adhesive tape or sheet, having the heat-treated UV cationic silicone release treating agent layer on one side of the substrate (substrate for a pressure-sensitive adhesive tape or sheet), other side being a face for forming a pressure-sensitive adhesive layer and having been subjected to back treatment. Therefore, as such a substrate, a substrate for a release liner or a substrate for a pressure-sensitive adhesive tape or sheet can be used. The substrate can appropriately be selected from various substrates such as a paper substrate, a plastic substrate, a fiber substrate and metal substrate, depending on the kind of the substrate (a substrate for a release liner, a substrate for a pressure-sensitive adhesive tape or sheet, and the like). The substrate can be used alone or by combining two kind or more. The substrate may have a form of a single layer or a form of a multilayer. Therefore, the substrate may be a laminate of a metal substrate and a plastic substrate, a laminate of a paper substrate and a plastic substrate, and the like. However, a substrate that a component disturbing the curing of the UV cationic silicone release treating agent is contained, and extracted in the UV cationic silicone release treating agent when applying the UV cationic silicone release treating agent, thereby causing poor curing of the UV cationic silicone release treating agent is not preferable.

As the paper substrate, Japanese paper, a foreign paper, a high quality paper, a glassine paper, a craft paper, a clupak paper, a crepe paper, a clay-coated paper, a top coat paper, a synthetic paper, a plastic laminate paper, a plastic coat paper and the like are exemplified. As the paper substrate, it is important to use a paper substrate that a base component does not expose or has not exposed on the surface layer so as not cause curing inhibition of the UV cationic silicone release treating agent on the face to which the UV cationic silicone release treating agent is applied. Further, as the paper substrate, a paper substrate having heat resistance can also suitably be used. As the paper substrate having heat resistance, a paper substrate having been subjected to a paper-neutralizing treatment (such as a neutralized paper), and the like are exemplified.

Further, as the plastic substrate, for example, a polyolefin sheet or film (a polyethylene sheet or film, a polypropylene sheet or film, an ethylene-propylene copolymer sheet or film, or the like), a vinyl chloride resin sheet or film, a vinyl acetate resin sheet or film, a fluororesin sheet or film, cellophanes, and the like are exemplified. Further, as the plastic substrate, a plastic substrate having heat resistance can also suitably be used. As the plastic substrate having heat resistance, for example, a polyester sheet or film (a polyethylene terephthalate sheet or film, a polyethylene naphthalate sheet or film, a polybutylene terephthalate sheet or film, or the like), a polyphenylene sulfide sheet or film, a polyether ether ketone sheet or film, a polyamideimide sheet or film, and a polyether imide sheet or film, a polyimide sheet or film, an amide resin sheet or film (a polyamide sheet or film, an all aromatic polyamide sheet or film, or the like) are exemplified.

Further, as the fiber substrate, for example, cloth substrates of a woven fabric or non-woven fabric of a mono- or blended fabric comprising a fibrous material of a natural fiber or a synthetic fiber, such as a cotton fiber, a spun yarn, Manila hemp, a pulp, a rayon, an acetate fiber, a polyester fiber, a polyvinyl alcohol fiber, a polyamide fiber, and a polyolefin fiber are exemplified. As the metal substrate, for example, an aluminum foil, a copper foil, a stainless steel foil and an iron foil are exemplified. As the metal substrate, a metal substrate having a basic surface causes curing inhibition of the UV cationic silicone release treating agent. Therefore, it is desirable to be inactivated.

The thickness of the substrate is not particularly limited, and can appropriately be selected depending on the kind of the substrate, the use purpose of the release-treated substrate, and the like. For example, the thickness can be selected from a range of from 2 to 1,000 μm. Specifically, as the thickness of the paper substrate, it is preferable to be from 50 to 150 μm, and as the thickness of the plastic substrate, it is preferable to be from 6 to 250 μm.

The surface of the substrate may be subjected to the conventional surface treatments such as a coating treatment by various coating agents such as an undercoating agent, and various treatments such a chromic acid treatment, an ozone exposure, a flame exposure, a high pressure electric shock exposure, or an ionizing radiation treatment, in order to increase adhesion to the heat-treated UV cationic silicone release treating agent layer or the like. As the undercoating agent, the conventional undercoating layer such as an acrylic undercoating layer, or a rubber undercoating agent (a styrene-butadiene block copolymer undercoating agent or the like) (preferably, an acrylic undercoating layer) can be used. Further, it is preferable that an undercoating agent layer by the undercoating agent has transparency, but may be colored depending on the use purpose and the like. However, as the surface treatment, a surface treatment that inhibits curing of the UV cationic silicone release treating agent is not preferable. For example, in the case that the surface treatment is a coating treatment with an undercoating agent, an undercoating agent that a component inhibiting curing of the UV cationic silicone release treating agent is contained, and extracted in the UV cationic silicone release treating agent when applying the UV cationic silicone release treating agent to the undercoating agent-treated surface, thereby causing poor curing of the UV cationic silicone release treating agent is not preferable as the undercoating agent.

In the case of a release liner, the release-treated substrate of the present invention has the heat-treated UV cationic silicone release treating agent layer at least partially on one side or both sides of the substrate (substrate for a release liner) as described before. That is, in the case that the release-treated substrate is a release liner, the heat-treated UV cationic silicone release treating agent layer may be formed on one side of the substrate for a release liner entirely or partially, and may be formed on one side of the substrate for release liner entirely or partially, and also formed on other side entirely or partially. For example, in the case that the heat-treated UV cationic silicone release treating agent layer is partially formed on either side of the substrate for a release liner, a release treating agent layer other than the heat-treated UV cationic silicone release treating agent layer may be formed on the portion on which the heat-treated UV cationic silicone release treating agent layer is not formed.

Further, in the case that the heat-treated UV cationic silicone release treating agent layer is formed on either side (one side) of the substrate for a release liner, a release treating agent layer other than the heat-treated UV cationic silicone release treating agent layer may be formed on other side. As the release treating agent layer other than the heat-treated UV cationic silicone release treating agent layer, a UV cationic silicone release treating agent layer formed by applying a UV cationic silicone release treating agent, and then conducting an ultraviolet irradiation treatment without conducting heat treatment, a release treating agent layer formed using a release treating agent other than the UV cationic silicone release treating agent (for example, an ultraviolet curing silicone release treating agent such as a radically addition polymerizable ultraviolet curing silicone release treating agent; a fluorine release treating agent; and a long chain alkyl release treating agent) and the like are exemplified.

Furthermore, in the case that the heat-treated UV cationic silicone release treating agent layer is formed on both sides of the substrate for a release liner, the heat-treated UV cationic silicone release treating agent layers on the both sides may be formed using, as two UV cationic silicone release treating agents, the same UV cationic silicone release treating agent, or may be formed using, as two UV cationic silicone release treating agents, different UV cationic silicone release treating agents. Further, the thickness of the respective heat-treated UV cationic silicone release treating agent layer may be the same or different.

Thus, in the case that the release-treated substrate of the present invention is a release liner, it can be used as a release liner for protecting a pressure-sensitive adhesive surface (for example, a pressure-sensitive adhesive layer surface on a pressure-sensitive adhesive sheet or tape) in various pressure-sensitive adhesive products. The pressure-sensitive adhesive products to which the release-treated substrate can be applied is not particularly limited so long as those have a pressure-sensitive adhesive surface, and pressure-sensitive adhesive products having a sheet form, such as a pressure-sensitive adhesive tape or sheet, a pressure-sensitive adhesive film and a pressure-sensitive adhesive label, various products having a form other than a sheet form (for example, a circuit substrate having a pressure-sensitive adhesive layer at least partially formed on at least one side thereof), and the like are exemplified. Such pressure-sensitive adhesive products can appropriately be selected from the conventional pressure-sensitive adhesive products, and used, depending on the kind of each pressure-sensitive adhesive product. Specifically, in the case that the pressure-sensitive adhesive product is a pressure-sensitive adhesive tape or sheet, as the pressure-sensitive adhesive tape or sheet, the conventional pressure-sensitive adhesive tapes or sheets (for example, a substrate-bearing pressure-sensitive adhesive tape or sheet having a pressure-sensitive adhesive layer by the conventional pressure-sensitive adhesive on at least one side of the conventional substrate, and a substrate-less pressure-sensitive adhesive tape or sheet having only a pressure-sensitive adhesive layer by the conventional pressure-sensitive adhesive) and the like are exemplified.

Further, in the case that the release-treated substrate of the present invention is a substrate for a pressure-sensitive adhesive tape or sheet, it has the heat-treated UV cationic silicone release treating agent layer at least partially (entirely or partially) on one side of the substrate (substrate for a pressure-sensitive adhesive tape or sheet), and other side is a face for forming the pressure-sensitive adhesive layer. That is, in the case that the release-treated substrate of the present invention is a substrate for a pressure-sensitive adhesive tape or sheet, a pressure-sensitive adhesive tape or sheet is obtained by providing the pressure-sensitive adhesive layer on a face on which the heat-treated UV cationic silicone release treating agent layer is not formed or has not been formed in the release-treated substrate (a face for forming a pressure-sensitive adhesive layer). In this case, the pressure-sensitive adhesive layer may previously be formed on the substrate (a substrate for a pressure-sensitive adhesive tape or sheet) in forming the heat-treated UV cationic silicone release treating agent layer. Therefore, the release-treated substrate may be a substrate used in preparing a pressure-sensitive adhesive tape or sheet, or may be a substrate in a pressure-sensitive adhesive tape or sheet.

(Pressure-Sensitive Adhesive Layer)

As the pressure-sensitive adhesive forming the pressure-sensitive adhesive layer, for example, the conventional pressure-sensitive adhesives can be used. As the pressure-sensitive adhesive, for example, an acrylic pressure-sensitive adhesive, a rubber pressure-sensitive adhesive, a silicone pressure-sensitive adhesive, a vinyl alkyl ether pressure-sensitive adhesive, a polyester pressure-sensitive adhesive, a polyamide pressure-sensitive adhesive, a urethane pressure-sensitive adhesive, a fluorine pressure-sensitive adhesive, a styrene-diene block copolymer pressure-sensitive adhesive, and creep property improvement pressure-sensitive adhesives of a blend of those pressure-sensitive adhesives and a heat-fusible resin having a melting point of about 200° C. or lower are exemplified. The pressure-sensitive adhesive can be used alone or by combining two kinds or more.

As the pressure-sensitive adhesive, an acrylic pressure-sensitive adhesive and a rubber pressure-sensitive adhesive can suitably be used from the standpoints of heat resistance and the like. As the acrylic pressure-sensitive adhesive, an acrylic pressure-sensitive adhesive comprising, as a base polymer or a polymer main component, an acrylic polymer (a homopolymer or a copolymer) using at least one of (meth) acrylic acid alkyl esters as a monomer main component, and if necessary, using at least one of monomers (copolymerizable monomers) copolymerizable with the (meth)acrylic acid alkyl esters is exemplified.

In the acrylic polymer, because the (meth)acrylic acid alkyl ester is used as the monomer main component, it is important that the proportion of the (meth)acrylic acid alkyl ester is 50% by weight or more, preferably from 85 to 98% by weight (particularly, from 90 to 97% by weight), to the whole amount of the monomer components. Therefore, it is important that the proportion of the copolymerizable monomer is 50% by weight or less, and preferably from 2 to 15% by weight (particularly, from 3 to 10% by weight), to the whole amount of the monomer components.

As the (meth)acrylic acid alkyl ester in the acrylic pressure-sensitive adhesive, for example, (meth)acrylic acid $C_{1-20}$ alkyl esters (preferably (meth)acrylic acid $C_{2-14}$ alkyl (linear or branched alkyl) esters) such as methyl(meth)acrylate, ethyl (meth)acrylate, propyl(meth)acrylate, isopropyl(meth)acrylate, butyl(meth)acrylate, isobutyl(meth)acrylate, s-butyl (meth)acrylate, t-butyl(meth)acrylate, pentyl(meth)acrylate, hexyl(meth)acrylate, heptyl(meth)acrylate, octyl(meth)acrylate, 2-ethylhexyl(meth)acrylate, isooctyl(meth)acrylate, nonyl(meth)acrylate, isononyl(meth)acrylate, decyl(meth) acrylate, isodecyl(meth)acrylate, undecyl(meth)acrylate, dodecyl(meth)acrylate, tridodecyl(meth)acrylate, tetradodecyl(meth)acrylate, pentadecyl(meth)acrylate, hexadecyl (meth)acrylate, heptadecyl(meth)acrylate, octadecyl(meth)acrylate, nonadecyl(meth)acrylate and eicosyl(meth)acrylate, are exemplified.

In the acrylic pressure-sensitive adhesive, as the copolymerizable monomer, for example, a carboxyl group-containing monomer or its anhydride, such as (meth)acrylic acid, itaconic acid, maleic acid, fumaric acid, crotonic acid and isocrotonic acid; an amide group-containing monomer such as acrylamide, methacrylamide, N-vinylpyrrolidone and N,N-dimethyl(meth)acrylamide; an amino group-containing monomer such as aminoethyl(meth)acrylate and (meth)acryloyl morpholine; a hydroxyl group-containing monomer such as an hydroxyalkyl(meth)acrylate (such as hydroxyethyl acrylate or hydroxypropyl acrylate) and glycerin dimethacrylate; an epoxy group-containing monomer such as glycidyl (meth)acrylate and methylglycidyl(meth)acrylate; an imide group-containing monomer such as cyclohexylmaleimide and isopropylmaleimide; an isocyanate group-containing monomer such as 2-methacryloyloxyethyl isocyanate; a sulfonic acid group-containing monomer such as sodium vinylsulfonate; an aromatic vinyl compound such as styrene and a substituted styrene; an cyano group-containing monomer such as acrylonitrile and methacrylonitrie; olefins or dienes such as ethylene, butadiene, isoprene and isobutylene; vinyl esters such as vinyl acetate; vinyl ethers such as vinyl alkyl ether; and vinyl chloride are exemplified. As the copolymerizable monomer, a monomer having a polar group such as a carboxyl group, an amide group (an amide bond-containing group), an amino group and a hydroxyl group (a polar group-containing monomer) can suitably be used.

The conventional crosslinking agent (cross binder) can be used as a cross binder in the acrylic pressure-sensitive adhesive in order to improve holding properties and the like of the pressure-sensitive adhesive. Such a crosslinking agent is not particularly limited, but, for example, an epoxy crosslinking agent (polyethylene glycol diglycidyl ether, diglycidyl ether, trimethylpropane triglycidyl ether, and the like), an isocyanate crosslinking agent (tolylene diisocyanate, trimethylolpropane triisocyanate, dipheylmethane diisocyanate, and the like), a metal chelate crosslinking agent, a metal salt crosslinking agent, a peroxide crosslinking agent, a melamine crosslinking agent, an amino crosslinking agent, and a coupling agent-type crosslinking agent (silane coupling agent) are exemplified.

Further, in the acrylic pressure-sensitive adhesive, in the case of conducting photopolymerization, a polyfunctional copolymerizable monomer (polyfunctional monomer) may be used as the copolymerizable monomer. As such a polyfunctional monomer, for example, ethylene glycol di(meth)acrylate, triethylene glycol di(meth)acrylate, tetraethylene glycol di(meth)acrylate, diethylene glycol di(meth)acrylate, propylene glycol di(meth)acrylate, 1,4-butylene glycol di(meth)acrylate, neopentyl glycol di(meth)acrylate, 1,6-hexanediol di(meth)acrylate, trimethylolpropane or tri(meth) acryate of its modified product, bisphenol A or di(meth)acrylate of its modified product, tetramethylolmethane tetra (meth)acrylate, pentaerythritol tri(meth)acrylate, pentaerythritol tetra(meth)acrylate, dipentaerythritol hexa (meth)cryalte, divinylbenznene, di(meth)acryalte of tris(2-hydroxymethtyl)isocyanurate, and tri(meth)acrylate of tris (2-hydroxymethtyl)isocyanurate are exemplified. In the photopolymerization, for example, the known and conventional photoinitiators such as an acetophenone photoinitiator, a benzophenone photoinitiator, a benzoin photoinitiator, a benzyl photoinitiator, a benzoin alkyl ether photoinitiator, a ketal photoinitiator, a thioxanthone photoinitiator, an α-ketol photoinitiator, and aromatic sulfonyl chloride photoinitiator, and a photoactive oxime photoinitiator can be used.

Further, the rubber pressure-sensitive adhesive uses a natural rubber or a synthetic rubber as the base polymer. As the synthetic rubber, for example, an acrylonitrile-butadiene rubber, a polyisoprene rubber, a polybutadiene rubber, a styrene-isoprene (SI) rubber, a styrene-butadiene (SB) rubber, a styrene-isoprene-styrene block copolymer (SIS) rubber, a styrene-butadiene-styrene block copolymer (SBS) rubber, a styrene-ethylene-butylene-styrene block copolymer (SEBS) rubber, a styrene-ethylene-propylene-styrene block copolymer (SEPS) rubber, a styrene-ethylene-propylene block copolymer (SEP) rubber, an ethylene-propylene copolymer rubber, an ethylene-propylene-diene copolymer rubber, a regenerated rubber, a butyl rubber, a polyisobutylene rubber, and their modified products are exemplified. In particular, from the standpoint of heat resistance, a carboxyl-modified acrylonitrile-butadiene rubber is suitable as the rubber pressure-sensitive adhesive.

Similar to the acrylic pressure-sensitive adhesive, the rubber pressure-sensitive adhesive can use the known crosslinking agent (cross binder) as a cross binder in order to improve holding properties of the pressure-sensitive adhesive. Such a crosslinking agent is not particularly limited, but, for example, sulfur, a peroxide crosslinking agent, a metal chelate crosslinking agent, a quinoid crosslinking agent, an epoxy crosslinking agent, an isocyanate crosslinking agent, a metal salt crosslinking agent, a melamine crosslinking agent, an amino crosslinking agent, and a coupling agent-type crosslinking agent (a silane coupling agent) are exemplified.

In the case that high heat resistance is required as a pressure-sensitive adhesive, one capable of polymerizing with ultraviolet irradiation or its polymerized product, and one capable of crosslinking with a crosslinking agent (for example, an epoxy crosslinking agent) or its crosslinked product can suitably be used as the base polymer (an acrylic polymer, a synthetic rubber or the like) of the pressure-sensitive adhesive. Thus, in the case of using one capable of crosslinking with a crosslinking agent or its crosslinked product as the base polymer (an acrylic polymer, a synthetic rubber or the like) of the pressure-sensitive adhesive, it is preferable that a reactive functional group such as a carboxyl group, a hydroxyl group or an amino group is introduced into the base polymer.

According to need, known various additives such as a tackifier (for example, a tackifier comprising a rosin derivative resin, a polyterpene resin, a petroleum resin, an oil-soluble phenolic resin or the like), a plasticizer, a softening agent, a filler, a coloring agent (a pigment, a dye or the like), and an antioxidant may be added to the pressure-sensitive adhesive.

The thickness of the pressure-sensitive adhesive layer is not particularly limited, but, for example, can be selected from a range of from 1 μm to 1.2 mm, and preferably from 5 to 80 μm.

The pressure-sensitive adhesive layer may have a single layer form or may have a form of laminating plural layers.

The pressure-sensitive adhesive layer can be formed by utilizing the known formation method of a pressure-sensitive adhesive layer. For example, the pressure-sensitive adhesive layer can be formed by a method of forming by directly applying a pressure-sensitive adhesive to a face for forming a pressure-sensitive adhesive layer in a substrate for a pressure-sensitive adhesive tape or sheet in a coating amount such that a thickness after drying is a predetermined thickness, and drying or curing, a method of forming by applying a pressure-sensitive adhesive to an appropriate separator (a release paper or the like) in a coating amount such that a thickness after drying is a predetermined thickness, and drying or curing, and transferring (moving) the pressure-sensitive adhesive layer to a face for forming a pressure-sensitive adhesive layer in a substrate for a pressure-sensitive adhesive tape or sheet, and the like.

Further, in the formation of the pressure-sensitive adhesive layer, according to need, a crosslinking treatment with heating or the like can be conducted, or polymerization with irradiation of electromagnetic wave (ultraviolet rays, electron beams or the like) can be conducted. Further, the pressure-sensitive adhesive layer can be formed utilizing a melt extrusion method.

The pressure-sensitive adhesive layer may previously be formed on a predetermined face of a substrate for a pressure-sensitive adhesive tape or sheet before forming the heat-treated UV cationic silicone release treating agent layer, and further may be formed on a predetermined face of a release-treated surface in which the heat-treated UV cationic silicone release treating agent layer has been formed on one side of a substrate for a pressure-sensitive adhesive tape or sheet.

The pressure-sensitive adhesive layer surface (a pressure-sensitive adhesive face) in such a pressure-sensitive adhesive tape or sheet can be protected by winding in a roll form by laminating with the heat-treated UV cationic silicone release treating agent layer in the release-treated substrate as a substrate for a pressure-sensitive adhesive tape or sheet.

As described before, the release-treated substrate of the present invention is prepared by applying a UV cationic silicone release treating agent, and conducting heat treatment before conducting ultraviolet irradiation treatment. Therefore, when ultraviolet irradiation treatment is conducted, there is the case that the effect is exhibited that reaction rate increases, resulting in increasing conversion. Further, when the conversion is thus high, aging may not be conducted after ultraviolet irradiation treatment. Further, it is possible in the heat treatment to remove moisture of a reaction inhibitor in conducting the ultraviolet irradiation treatment. Additionally, the leveling effect on the coated face can be exhibited.

[Production Method of Release-Treated Substrate]

The production method of the release-treated substrate of the present invention is a method of producing the release-treated substrate, and is provided with a step of applying heat treatment to a coating layer of a cationically polymerizable ultraviolet curing silicone release treating agent, which is formed by at least partially applying the cationically polymerizable ultraviolet curing silicone release treating agent to at least one side of a substrate, and which is not subjected to ultraviolet irradiation treatment. Therefore, the release-treated substrate can be prepared by the production method having the following steps (A) to (C).

Step (A): a step of at least partially applying a UV cationic silicone release treating agent to at least one side of a substrate (coating step).

Step (B): a step of conducting heat treatment to a coating layer of the UV cationic silicone release treating agent (heat treatment step).

Step (C): a step of conducting ultraviolet irradiation treatment to the heat-treated coating layer of the UV cationic silicone release treating agent (ultraviolet irradiation treatment step).

In the step (A), the UV cationic silicone release treating agent is applied to a predetermined site on a predetermined face of the substrate (a substrate for a release liner, a substrate for a pressure-sensitive adhesive tape or sheet, or the like). In the application of the UV cationic silicone release treating agent, the conventional coaters (for example, a gravure roll coater, a reverse roll coater, a kiss roll coater, a dip roll coater, a bar coater, a knife coater and a spray coater) can be used. It is important that the coating amount of the UV cationic silicone release treating agent is an appropriate coating amount (for example, from 0.01 to 10 g/m$^2$).

Further, in the step (B), after the step (A), heat treatment is conducted to the coating layer of the UV cationic silicone release treating agent (uncured UV cationic silicone release treating agent layer) in the substrate having the UV cationic silicone release treating agent applied thereto. In conducting the heat treatment to the coating layer of the UV cationic silicone release treating agent, the known heating apparatus (for example, a heating oven, a hot plate, a hot air dryer, a near infrared lamp, or an air dryer) can be used. The heating temperature can be selected from a range of from 35 to 120° C. (preferably from 40 to 110° C., and more preferably from 50 to 100° C.). Further, the heating time can be selected from a range of from 3 seconds to 2 minutes (preferably from 5 seconds to 1 minute).

In conducting heat treatment to the coating layer of the UV cationic silicone release treating agent, the heating treatment may be conducted such that the heat treatment is conducted to only the coating layer of the UV cationic silicone release treating agent, or may be conducted to the whole substrate having the coating layer of the UV cationic silicone release treating agent.

Further, in the step (C), after the step (B), ultraviolet irradiation treatment is conducted to the coating layer of the UV cationic silicone release treating agent, to which heat treatment has been conducted after applying the UV cationic silicone release treating agent. In conducting the ultraviolet irradiation treatment to the coating layer of the UV cationic silicone release treating agent, to which heat treatment has been conducted, the known ultraviolet irradiation apparatus (for example, an ultraviolet irradiation apparatus using a fusion (H) lamp, a metal halide lamp or a high pressure mercury lamp (ozone generation type, ozone-less type) as a light source) can be used. In particular, by using the fusion (H) lamp as a light source, the ultraviolet irradiation treatment can be conducted with high productivity. Illumination (illumination measured using MICROCURE, a product of EIT Co.) can appropriately be selected from a range of, for example, from 10 to 3,000 (mW/cm$^2$) (preferably from 50 to 2,500 (mW/cm$^2$), and more preferably from 100 to 2,200 (mW/cm$^2$)). Further, line speed in irradiating can appropriately be selected from a range of, for example, from 1 to 200 m/min (preferably from 3 to 180 m/min, and more preferably from 10 to 150 m/min).

In conducting the ultraviolet irradiation treatment to the coating layer of the heat-treated UV cationic silicone release treating agent, to which the heat treatment has been conducted, the ultraviolet irradiation treatment may be conducted such that the ultraviolet irradiation treatment is conducted to only the coating layer of the heat-treated UV cationic silicone release treating agent, or may be conducted to the whole substrate having the coating layer of the UV cationic silicone release treating agent, to which the heat treatment has been conducted.

In the present invention, each step can be carried out by (1) a method of discontinuously conducting the step (A), the step (B) and the step (C) as the respective independent step, (2) a method of continuously conducting the step (A) and the step (B) as a series of steps, and then conducting the step (C) (3) a method of conducting the step (A), and then continuously conducting the step (B) and the step (C) as a series of steps, (4)

a method of continuously conducting the step (A), the step (B) and the step (C) as a series of steps, or the like.

According to the release-treated substrate of the present invention, adhesion between the release-treating agent layer by the cationically polymerizable ultraviolet curing silicone release treating agent, and the substrate is excellent. As a result, dropout of a silicone component in the release treating agent layer from the substrate can be suppressed or prevented even in the case of exposing under excessive heating or humidifying conditions, or storing over a long period of time.

The present invention is described in more detail below based on the Examples, but the invention is not limited by those Examples. In the following Examples, "part" means "part by weight", and "%" means "% by weight". Further, in the preparation and the measurement of a heat-treated substrate, conditions such as temperature in the case that the condition such as temperature are not limited, are the conditions of 23° C. and 50% RH.

EXAMPLE 1

1 part of a trade name "CAT-7603" (a product of Shin-Etsu Chemical Co., Ltd.) was added to 100 parts of a trade name "X-62-7629." (a product of Shin-Etsu Chemical Co., Ltd.), and stirred to obtain a release treating liquid as a cationically polymerizable ultraviolet curing silicone release treating agent.

This release treating liquid was applied to one side of a high quality paper (basis weight: 70 g), heated with a batchwise heating oven (preset temperature: 80° C.) for 30 seconds, and then subjected to ultraviolet irradiation treatment with one high pressure mercury lamp (ozone generation type, output: 80 W/cm) by a conveyer delivery at a line speed: 10 m/min, thereby obtaining a release-treated substrate. In the release-treated substrate obtained, the coating amount of the cationically polymerizable ultraviolet curing silicone release treating agent was 1.5 g/m$^2$ (solid content).

Further, the maximum temperature on the material surface in heat treating with the heating oven was 77° C. The measurement of surface temperature was conducted with a simplified temperature detection label (a trade name "THERMO-LABEL", a product of Nichiyu Giken Kogyo Co., Ltd.).

EXAMPLE 2

A release treating liquid was obtained in the same manner as in Example 1. This release treating liquid was applied to one side of the same high quality paper (basis weight: 70 g) as in Example 1, heated with a batchwise heating oven (preset temperature: 40° C.) for 60 seconds, and then subjected to ultraviolet irradiation treatment with one high pressure mercury lamp (ozone generation type, output: 80 W/cm) by a conveyer delivery at a line speed: 10 m/min, thereby obtaining a release-treated substrate. In the release-treated substrate obtained, the coating amount of the cationically polymerizable ultraviolet curing silicone release treating agent was 1.6 g/m$^2$ (solid content). Further, the maximum temperature on the material surface in heat treating with the heating oven was 40° C.

EXAMPLE 3

A release treating liquid was obtained in the same manner as in Example 1. This release treating liquid was applied to one side of the same high quality paper (basis weight: 70 g) as in Example 1, heated with a batchwise heating oven (preset temperature: 110° C.) for 30 seconds, and then subjected to ultraviolet irradiation treatment with one high pressure mercury lamp (ozone generation type, output: 80 W/cm) by a conveyer delivery at a line speed: 10 m/min, thereby obtaining a release-treated substrate. In the release-treated substrate obtained, the coating amount of the cationically polymerizable ultraviolet curing silicone release treating agent was 1.4 g/m$^2$ (solid content). Further, the maximum temperature on the material surface in heat treating with the heating oven was 107° C.

EXAMPLE 4

1.5 parts of a trade name "UV9380C" (a product of GE Toshiba Silicone Co., Ltd.) were added to 100 parts of a trade name "UV9300C" (a product of GE Toshiba Silicone Co., Ltd.), and stirred to obtain a release treating liquid as a cationically polymerizable ultraviolet curing silicone release treating agent.

This release treating liquid was applied to one side of a polyethylene film (a trade name "NSO", a product of Okura Industrial Co., Ltd.), heated with a batchwise heating oven (preset temperature: 80° C.) for 30 seconds, and then subjected to ultraviolet irradiation treatment with one high pressure mercury lamp (ozone generation type, output: 80 W/cm) by a conveyer delivery at a line speed: 10 m/min, thereby obtaining a release-treated substrate. In the release-treated substrate obtained, the coating amount of the cationically polymerizable ultraviolet curing silicone release treating agent was 1.0 g/m$^2$ (solid content). Further, the maximum temperature on the material surface in heat treating with the heating oven was 78° C.

EXAMPLE 5

A release treating liquid was obtained in the same manner as in Example 1. This release treating liquid was applied to one side of the same high quality paper (basis weight: 70 g) as in Example 1, heated with a batchwise heating oven (preset temperature: 80° C.) for 30 seconds, and then subjected to ultraviolet irradiation treatment with one high pressure mercury lamp (ozone generation type, output: 80 W/cm) by a conveyer delivery at a line speed: 10 m/min, thereby obtaining a release-treated substrate. In the release-treated substrate obtained, the coating amount of the cationically polymerizable ultraviolet curing silicone release treating agent was 0.3 g/m$^2$ (solid content). Further, the maximum temperature on the material surface in heat treating with the heating oven was 77° C.

EXAMPLE 6

A release treating liquid was obtained in the same manner as in Example 1. This release treating liquid was applied to one side of the same high quality paper (basis weight: 70 g) as in Example 1, heated with a batchwise heating oven (preset temperature: 80° C.) for 30 seconds, and then subjected to ultraviolet irradiation treatment with one high pressure mercury lamp (ozone generation type, output: 80 W/cm) by a conveyer delivery at a line speed: 10 m/min, thereby obtaining a release-treated substrate. In the release-treated substrate obtained, the coating amount of the cationically polymerizable ultraviolet curing silicone release treating agent was 3.5 g/m² (solid content). Further, the maximum temperature on the material surface in heat treating with the heating oven was 77° C.

COMPARATIVE EXAMPLE 1

A release treating liquid was obtained in the same manner as in Example 1. This release treating liquid was applied to one side of the same high quality paper (basis weight: 70 g) as in Example 1, subjected to ultraviolet irradiation treatment with one high pressure mercury lamp (ozone generation type, output: 80 W/cm) by a conveyer delivery at a line speed: 10 m/min, and then heated with a batchwise heating oven (preset temperature: 80° C.) for 30 seconds, thereby obtaining a release-treated substrate. In the release-treated substrate obtained, the coating amount of the cationically polymerizable ultraviolet curing silicone release treating agent was 1.5 g/m² (solid content). Further, the maximum temperature on the material surface in heat treating with the heating oven was 78° C.

COMPARATIVE EXAMPLE 2

A release treating liquid was obtained in the same manner as in Example 1. This release treating liquid was applied to one side of the same high quality paper (basis weight: 70 g) as in Example 1, and then subjected to ultraviolet irradiation treatment with one high pressure mercury lamp (ozone generation type, output: 80 W/cm) by a conveyer delivery at a line speed: 10 m/min, thereby obtaining a release-treated substrate. In the release-treated substrate obtained, the coating amount of the cationically polymerizable ultraviolet curing silicone release treating agent was 1.6 g/m² (solid content).

(Evaluation)

With respect to the release-treated substrates obtained in Examples 1 to 6 and Comparative Examples 1 to 2, adhesion of the cationically polymerizable ultraviolet curing silicone release treating agent layer to the substrate and peel force of the release-treated substrate to the pressure-sensitive adhesive layer were measured or evaluated by the following measurement method or evaluation method. The measurement results or evaluation results are shown in Table 1.

(Evaluation Method of Adhesion)

A dropout state of a coating film when placing a release-treated substrate on a glass place such that a surface of the side on which a coating by the cationically polymerizable ultraviolet curing silicone release treating agent is formed faces upward, placing a silicone rubber having a contact area of 10 mm×10 mm and Shore A hardness (JIS K6301, spring type A model) of 70 on the coating, and conducting an operation of reciprocating 10 cm under a pressure abrasion of 0.5 MPa at a speed of 1 m/min five times or 10 times, was observed, and adhesion of the cationically polymerizable ultraviolet curing silicone release treating agent layer to the substrate was evaluated by the following criteria.

Evaluation Criterion

⊚: No dropout of a coating film even by rubbing 10 times.
○: No dropout of a coating film even by rubbing 5 times, but slight scratches on surface layer when rubbing 10 times.
Δ: When rubbing 5 times, a part of coating film drops out.
X: When rubbing 5 times, greater part of coating film drops out. Alternatively, smear generates.

(Measurement Method of Peel Force)

A pressure-sensitive adhesive solution shown below was applied to a release-treated surface of a release-treated substrate (that is, a face of a side on which a coating film by a cationically polymerizable ultraviolet curing silicone release treating agent layer is formed). Drying treatment was conducted at 120° C. for 2 minutes in the case that a substrate in a release-treated substrate is a high quality paper, and at 80° C. for 3 minutes in the case of a polyethylene film to form a pressure-sensitive adhesive layer of thickness: 50 μm, thereby preparing a pressure-sensitive adhesive sheet.

Pressure-Sensitive Adhesive Solution

Butyl acrylate: 95 parts and acrylic acid: 5 parts were charged, and using ethyl acetate as a solvent, solution polymerization was conducted under nitrogen substitution at 60° C. while stirring to prepare a solution of a pressure-sensitive adhesive composition of viscosity: about 100 Pa·s, rate of polymerization: 99.3%, and solid content of 32%. A multi-functional epoxy crosslinking agent (a trade name "TETRAD C", a product of Mitsubishi Gas Chemical Company, Inc.): 0.1 part (solid content) was added to this solution: 100 parts (solid content) to obtain a pressure-sensitive adhesive solution.

A polyester film having a thickness of 25 μm was adhered to a face at the pressure-sensitive adhesive layer side of a pressure-sensitive adhesive sheet, and cut in 50 mm width and 150 mm length. A cover plate was placed on a back surface of this cut piece, and a release-treated substrate side was peeled with Tensilon tensile tester at a tensile speed of 300 mm/min and an angle of 180° under conditions of 23° C. and 50% RH. The maximum stress (N/50 mm) (the maximum value from which a peak top at initial measurement has been removed) in such a case was measured, and this maximum stress was defined as a peel force (N/50 mm).

TABLE 1

|  | Example | | | | | | Comparative Example | |
| --- | --- | --- | --- | --- | --- | --- | --- | --- |
|  | 1 | 2 | 3 | 4 | 5 | 6 | 1 | 2 |
| Adhesion | ⊚ | ○ | ○ | ⊚ | ⊚ | ⊚ | Δ | Δ |
| Peel force (N/50 mm) | 0.45 | 0.43 | 0.46 | 0.61 | 0.65 | 0.37 | 0.47 | 0.49 |

As is apparent from Table 1, because the release-treated substrates according to the Examples are that heat treatment is conducted before conducting ultraviolet irradiation treatment, it was confirmed that adhesion of the cationically polymerizable ultraviolet curing silicone release treating agent layer to the substrate can be improved without substantially changing peel force of the release-treated substrate to the pressure-sensitive adhesive layer.

While the invention has been described in detail and with reference to specific embodiments thereof, it will be apparent to one skilled in the art that various changes and modifications can be made therein without departing from the spirit and scope thereof.

What is claimed is:

1. A method of producing a release-treated substrate, comprising at least partially coating a substrate with a mixture consisting of a cationically polymerizable ultraviolet curing silicone release treating agent and a photopolymerization initiator to form a release treating agent layer, and subjecting to a heat treatment the release treating agent layer which has not been subjected to ultraviolet irradiation treatment.

2. The method as claimed in claim 1, wherein the cationically polymerizable ultraviolet curing silicone release treating agent is a cationically polymerizable ultraviolet curing silicone release treating agent wherein a modified silicone polymer component having at least two epoxy groups in the molecule is an effective component.

3. The method as claimed in claim 1, wherein the temperature in the heat treatment is from 35 to 120° C.

4. The method as claimed in claim 1, further comprising placing the release-treated substrate on a glass plate such that a surface of the side on which the release treating agent layer is formed faces upward, placing a silicone rubber having a contact area of 10 mm×10 mm and Shore A hardness measured by means of spring type A model according to JIS K6301 of 70 on the release treating agent layer, and subjecting the release treating agent layer to an operation of reciprocating 10 cm under a pressure abrasion of 0.5 MPa at a speed of 1 m/min five times, the release treating agent layer does not peel off from the substrate.

5. The method as claimed in claim 1, wherein the release-treated substrate is a release liner having the release treating agent layer by the cationically polymerizable ultraviolet curing silicone release treating agent on one side or both sides of the substrate.

6. The method as claimed in claim 1, wherein the release-treated substrate is a substrate for a pressure-sensitive adhesive tape or sheet, having the release treating agent layer on one side of the substrate, and wherein the other side of the substrate has been subjected to back treatment for forming a pressure-sensitive adhesive layer.

\* \* \* \* \*